United States Patent
Türünç et al.

(10) Patent No.: US 11,608,421 B2
(45) Date of Patent: Mar. 21, 2023

(54) METHOD OF MAKING DISPERSIONS

(71) Applicant: Dow Global Technologies LLC, Midland, MI (US)

(72) Inventors: Oguz Türünç, Terneuzen (NL); Francois M. Casati, Pfaffikon (CH); Hamideh Ahmadloo, Horgen (CH); Alex Stepuk, Zürich (CH); Paul Cookson, Samstagern (CH)

(73) Assignee: Dow Global Technologies LLC, Midland, MI (US)

(*) Notice: Subject to any disclaimer, the term of this patent is extended or adjusted under 35 U.S.C. 154(b) by 355 days.

(21) Appl. No.: 16/767,628

(22) PCT Filed: Dec. 13, 2018

(86) PCT No.: PCT/US2018/065399
§ 371 (c)(1),
(2) Date: May 28, 2020

(87) PCT Pub. No.: WO2019/118693
PCT Pub. Date: Jun. 20, 2019

(65) Prior Publication Data
US 2020/0369845 A1   Nov. 26, 2020

Related U.S. Application Data

(60) Provisional application No. 62/599,277, filed on Dec. 15, 2017.

(51) Int. Cl.
C08J 9/12        (2006.01)
C08G 18/63    (2006.01)
C08K 3/36      (2006.01)

(52) U.S. Cl.
CPC ............ C08J 9/125 (2013.01); C08G 18/636 (2013.01); C08K 3/36 (2013.01); C08G 2110/0008 (2021.01); C08J 2201/022 (2013.01); C08J 2203/10 (2013.01); C08J 2205/06 (2013.01)

(58) Field of Classification Search
CPC ................. C08G 18/63; C08G 18/636; C08G 2110/0008; C08J 9/125; C08J 2201/022; C08J 2203/10; C08J 2205/06; C08K 3/36
See application file for complete search history.

(56) References Cited

U.S. PATENT DOCUMENTS

| | | | |
|---|---|---|---|
| 5,746,992 A | 5/1998 | Yoldas | |
| 9,403,932 B2 | 8/2016 | Eling | |
| 2005/0043425 A1 | 2/2005 | Beck | |
| 2010/0234517 A1* | 9/2010 | Plantenberg | C09D 183/04 524/501 |

FOREIGN PATENT DOCUMENTS

| | | | | |
|---|---|---|---|---|
| JP | 3721544 B2 * | 11/2005 | ........... | C08G 18/837 |
| WO | WO-2010150677 A1 * | 12/2010 | ............. | B82Y 30/00 |
| WO | 2005-043425 A | 3/2013 | | |

OTHER PUBLICATIONS

Türünç et al., Nonisocyanate based polyurethane/silica nanocomposites and their coating performance, J. Sol-Gel Sci Technol (2008) 47:290-299.

Stober et al., Controlled Growth of Monodisperse Silica Spheres in the Micron Size Range, J. Colloid and Interface Science 26, 62-69 (1968).

* cited by examiner

Primary Examiner — John M Cooney

(57) ABSTRACT

Dispersions of silicate particles are formed in a polyol phase. The polyol, an alkoxysilane, water and catalyst are combined and reacted under specific temperature conditions to form the silicate particles in-situ in a liquid polyol phase. The dispersions are characterized in having excellent stability.

9 Claims, No Drawings

METHOD OF MAKING DISPERSIONS

This invention relates to methods for making dispersions of silica gel particles in a polyol.

Very large volumes of polyurethane foam are manufactured annually across the globe. This foam is almost always made in a reaction of a polyisocyanate with a polyol in the presence of a blowing agent. By the selection of particular starting materials and processing conditions, the physical characteristics of these foams can be made to range quite widely. The foam can be quite rubbery, as is the case with foam that is manufactured for seating, bedding and other cushioning applications. It can instead be made to be stiff and rigid, as is the case with many thermal insulation foams. The foam can be made to be easily penetrable to gases and fluids, or can be a closed-cell type in which little or any gas can flow through.

It is common to incorporate small particles into the foam structure. The particles can perform a variety of functions, depending on the type of foam in which they are used. In flexible foam, the particles can function to strengthen the foam so it can support more weight. They can also function to open the cells of flexible foams. In rigid foams, the particles are often used to help regulate cell size, as their presence tends to reduce the size of the cells. Smaller cells often correlate to better heat insulation. The particles also may promote char formation under fire conditions. Char formation can reduce flame spread by forming a physical barrier between the flame front and the foam, thereby blocking the flames from a potential source of fuel.

Particles used for these purposes tend to be polymer particles. One of the reasons polymer particles are favored is that various grafting technologies have been developed to bond the polymer particles to the polyols used to make the foam. This ability to graft the particles is of major importance. Particles that are not grafted in this way are very difficult to disperse uniformly into the foam. They instead tend to settle out from the other starting materials. This leads to clogging of lines, equipment fouling, changes in the composition over time as the particles phase separate, and inconsistent foam quality due to the non-uniform dispersion of the particles and changes in the particle content over time.

There have been attempts to include silica particles in polyurethane foams. These attempts have generally involved forming dispersions of the silica particles in the polyol component. The silica particles are formed in a separate sol-gel process by reacting an alkoxysilane with water in the presence of a solvent and an ammonia catalyst. They are then dispersed into the polyol, typically via a solvent transfer process. See, e.g., WO 2013/030173, U.S. Pat. No. 9,403,932 and US Published Patent Application No 2005/0043425. US 2005/0043425 describes an attempt to stabilize the resulting dispersion by reacting the surfaces of the silica particles with polyol molecules. This results in poor stabilization. The particles separate from the polyol upon standing.

Türünç et al. in *J. Sol-Gel Technology* (2008) 47:290-299 describe a method for forming polyurethane-silica nanocomposite coatings using non-isocyanate chemistry. Silica particles are first formed and then functionalized with a carbonate-functional silane coupling agent. The functionalized particles are then mixed with a carbon dioxide-modified epoxy resin and a diamine.

Because of the excellent potential benefits of dispersing silica particles into polyurethane foam, a method by which silica particles can be more stably dispersed into a polyol is desired.

This invention is such a process. The inventive process comprises the steps of a) forming a mixture by combining i) 0.5 to 50 parts by weight of at least one alkoxysilane in which the alkoxy groups each independently contain 1 to 4 carbon atoms, ii) 100 parts by weight of one or more polyols each having a hydroxyl equivalent weight of 125 to 5000, the one or more polyols having an average at least 1.8 hydroxyl groups per molecule, iii) at least one mole of water per mole of the at least one alkoxysilane and iv) a catalyst for the reaction of the alkoxysilane and water, and then;

b) at a temperature of 10 to 70° C. and under agitation, reacting the at least one alkoxysilane and water in presence of the one or more polyols to form a dispersion of silica particles in a continuous phase of the one or more polyols; and then c) stripping the dispersion to remove residual water and volatiles.

This process produces dispersions having good stability. A further advantages of the process is that the problem of separately forming the silica particles and then dispersing them into the polyol phase is avoided. In addition, there is no need for any alcoholic solvent in the process, which avoids the problems of removing such a solvent from the product and of having residual solvent remain in the product.

When the product dispersion is used to make flexible polyurethane foam, benefits such as increased tensile strength, tear strength and/or elongation, higher load bearing and improved fire resistance (on tests such as the Cal 117 test) are seen. The dispersion processes readily in a variety of foam formulations.

In this invention, the polyol(s), alkoxysilane, water and catalyst are combined to form a reaction mixture that is reacted to form the dispersion.

The alkoxysilane is preferably a tetraalkoxysilane. The alkoxy groups independently contain 1 to 4 carbon atoms. A preferred alkoxysilane is tetraethoxysilane (also known as tetraethyl orthosilicate, TEOS). Tetramethoxysilane (tetramethyl orthosilicate, TMOS) is also useful.

The polyol (or each polyol if more than one) has a hydroxyl equivalent weight of 125 to 5000 and may have a hydroxyl equivalent weight of at least 250, at least 350, at least 500, at least 800 or at least 1000. The hydroxyl equivalent weight may be up to 2500, up to 2000 or up to 1750.

The polyol or mixture of polyols (if more than one) has a number average of at least 1.8 hydroxyl groups per molecule and may have, for example, an average of up to 8, up to 6, up to 4 or up to 3 hydroxyl groups per molecule.

In some embodiments, at least 35%, at least 50% or at least 70% of the hydroxyl groups of the one or more polyols are primary hydroxyl groups.

The polyol (or each polyol if more than one) may be a polyether. Such a polyether may be a polymer or copolymer of any one or more of 1,2-propylene oxide, 1,2-butylene oxide, 2,3-butylene oxide or tetrahydrofuran. The polyether may be a polymer of ethylene oxide or copolymer of ethylene oxide with any one or more of the foregoing monomers. In some embodiments, the polyether is a random or block copolymer of 1,2-propylene oxide and ethylene oxide. An especially preferred polyether is a block copolymer formed by polymerizing a 1,2-propylene oxide and then ethylene oxide onto an initiator compound that contains at least two, preferably 2 to 4, hydroxyl groups. Copolymers of ethylene oxide may contain at least 5 weight percent of oxyethylene units and preferably contain up to 50 weight percent, more preferably up to 25 weight percent or up to 17 weight percent, oxyethylene units. At least 50%, preferably at least 70%, of their hydroxyl groups may be primary.

The polyol may be devoid of amino groups.

The polyol preferably one in which water is miscible at the relative proportions thereof as are present in the reaction mixture. Miscibility is evaluated by mixing the water and polyol at the stated proportions in a suitable container and allowing the mixture to stand at room temperature for 24 hours. Miscibility is indicated by the lack of formation of separate water and/or polyol layers. It is especially preferred that the polyol, water and alkoxysilane form a single-phase mixture at the relative proportions present in the reaction mixture.

The weight of alkoxysilane provided to the reaction mixture may be, for example, at least 0.5 part, at least 1 part, at least 3 parts, at least 5 parts, at least 10 parts or at least 15 parts per 100 parts by weight polyol(s) and may be, for example, up to 50 parts, up to 40 parts, up to 35 parts, up to 30 parts or up to 25 parts, on the same basis.

At least one mole of water is provided to the reaction mixture per mole of alkoxysilane. A preferred amount is at least 2 moles or at least 3 moles per mole of alkoxysilane. A preferred upper amount is about 20 moles of water per mole of alkoxysilane.

The catalyst is any material that catalyzes the hydrolysis of the alkoxysilane to form a silanol intermediate. Acidic and basic catalysts are useful, with basic catalysts being generally preferred. Acidic catalysts tend to promote branching and to produce silicate particles that are often irregular in shape and size, whereas basic catalysts tend to produce more spherical particles. Water-soluble catalysts and catalysts that are volatile or form volatile decomposition products that can be removed from the product dispersion by stripping are generally preferred. "Volatile" as used herein means the material under consideration has a boiling temperature of no greater than 100° C. at one atmosphere pressure. Examples of suitable catalysts include mineral acids such as hydrochloric acid, hydrofluoric acid and sulfuric acid; organic acids such as p-toluenesulfonic acid, acetic acid and fluoroacetic acid; alkali metal hydroxides, alkali metal alkoxides, alkaline earth hydroxides, alkaline earth alkoxides, tertiary amine compounds, ammonia, ammonium hydroxide and quaternary ammonium compounds. Ammonia and ammonium hydroxide are especially preferred. Ammonia may be provided in the form of an aqueous ammonia solution in which part or all of the ammonia may be in the form of ammonium hydroxide ($NH_4^+OH^-$).

It is preferred to combine the ingredients such that either the alkoxysilane or catalyst is added last. In some embodiments, the water, polyol(s) and alkoxysilane are combined, followed by the addition of the catalyst. In alternative embodiments, the water, polyol(s) and catalyst are combined, followed by the addition of the alkoxysilane.

The temperatures of the individual components preferably are no greater than 70° C., more preferably no greater than 60° C. or no greater than 55° C. at the time of mixing with the other components.

Components in addition to the polyol, alkoxysilane, catalyst and water are generally unnecessary and preferably are present in the reaction mixture formed in step a) (and from the process in general) in small quantities if present at all.

In particular, alcoholic solvents having a hydroxyl equivalent weight of less than 125 (other than those formed as a by-product of the reactions of the alkoxysilane compounds) are not needed and can be omitted from the reaction mixture formed in step a) and from the process as a whole. Such alcohols, if added at all to the reaction mixture during steps a) or b), preferably are added in an amount of at most 5 parts by weight, preferably at most 2 parts by weight, per 100 parts by weight of the polyol(s).

Similarly, other isocyanate-reactive compounds, such as those having primary or secondary amino groups or thiol groups, which have a molecular weight of less than 250, preferably are omitted or if present during steps a) and/or b) of the process, are present in an amount of at most 5 parts by weight, preferably at most 2 parts by weight, per 100 parts by weight of the polyol(s).

In addition, volatile organic compounds other than the ingredients specifically required (and by-products of the reaction) preferably are omitted or if present during steps a) and/or b) of the process, are present in an amount of at most 5 parts by weight, preferably at most 2 parts by weight, per 100 parts by weight of the polyol(s).

The reaction step b) is performed under conditions of agitation and control of temperature to within the range of 10 to 70° C. The reaction temperature preferably is at least 20° C., at least 30° C. or at least 40° C. and is preferably up to 65° C., up to 60° C., up to 55° C. or up to 50° C. The reaction is exothermic, and the exothermic heat of reaction can heat the reaction mixture to greater than 70° C. under some circumstances, particularly in embodiments in which the catalyst is added last. In such a case, the rate of addition of the last-added ingredient, in particular the catalyst, may be selected such that the exothermic heat of reaction does not increase the reaction temperature to above 70° C. Alternatively, cooling may be applied to control the temperature rise due to the exothermic heat of reaction.

The reaction can be performed at atmospheric, superatmospheric or subatmospheric pressure, provided that the reactants, in particular the water, do not boil under the temperature and pressure conditions of the reaction. The reaction preferably is continued until at least 90%, at least 95% or at least 98% of the alkoxy groups of the alkoxysilane are hydrolyzed. The reaction time may be, for example 5 minutes to 5 hours. A preferred reaction time is 30 to 120 minutes.

The starting materials react to form silicate particles dispersed in the polyol(s). It is believed that a portion of the polyol may become incorporated into the silicate particles, and/or at least a portion of the silicate particles become grafted to at least part of the polyol.

By "silicate particles", it is meant silicon-containing reaction products of the alkoxysilane, water and optionally the polyol. The silicate particles typically contain at least Si—O—Si linkages that are formed by the hydrolysis of the alkoxy groups to form silanols, followed by the condensation of the silanols. The silicate particles may contain residual alkoxy groups and may contain one or more Si-polyol bonds.

The reaction product is then stripped to remove residual water and volatiles. The residual water is water that is not consumed in the reaction and/or is produced in the reaction. "Volatiles" include chemical species having a boiling temperature (at one atmosphere pressure) of 100° C. or below, including alcohol by-products of the silicate-forming reactions. Among the volatiles are alkanol reaction by-products that are produced (and removed during the stripping step) when the starting alkoxysilane is hydrolyzed in the reaction. Other volatiles may include residual catalyst and/or catalyst decomposition residues.

By "stripping", it is simply meant subjecting the product of the reaction step to conditions under which at least a portion of the water and volatiles are removed. Stripping can be accomplished using one or more of the following methods: i) exposing the product to a subatmospheric pressure; ii) exposing the product to an elevated temperature sufficient to volatilize the water and volatiles and iii) flowing a gas through the product to entrain and remove water and volatiles. The conditions of the stripping are selected to avoid volatilizing and/or thermally degrading the polyol(s) and silicate particles. The subatmospheric pressure may be, for example, 1 to 100 kPa; the elevated temperature may be, for example 30 to 100° C., preferably 50 to 90° C.; the stripping gas (if any) may include, for example, air, argon, nitrogen, helium, hydrogen and like.

The stripping step may be continued until the water content and the content of alkanol reaction by-products of the product each are reduced to at most 0.25% by weight, preferably to at most 0.1% by weight, based on the weight of the product after the stripping step is completed. Total volatiles (including water) may be at most 0.1% by weight, on the same basis.

The product is a dispersion of silicate particles in a liquid polyol phase. The silicate particles may have particle sizes within the range, for example of 25 nm to 50 µm, as measured using microscopic methods such as scanning electron microscopy (SEM). In some embodiments, at least 90% by volume of the silicate particles have particle sizes in the range of 25 nm to 30 µm, or in the range of 50 nm to 20 µm. In some embodiments, the particles may be agglomerates of smaller particles.

The product may contain at least 0.04 wt-% silicon (which silicon is incorporated into silicates) and up to as much as about 10% silicon. In some embodiments, the product contains at least 0.1 wt-%, at least 0.25 wt-%, at least 0.4 wt-%, at least 1 wt-% or at least 2 wt-% silicon and may contain up to 7.5 wt-%, up to 6.5 wt-%, up to 5 wt-% or up to 4 wt-% silicon. The polyol(s) may constitute, for example, 50 to 99.9 wt-% of the product. In some embodiments, the polyol(s) constitute 80 to 97 wt-% of the product.

The product dispersion is highly storage-stable, in that the silicate particles tend to remain suspended within the liquid polyol phase for prolonged periods with little or no settling. Settling is determined visually by allowing a sample to sit in a closed container, without agitation, under nitrogen or other inert gas at atmospheric pressure and 22±2° C. for a period of time and observing the formation of a separate layer of silicate particles. This is an important advantage because the storage stability permits the product to be stored and transported without sedimentation in its containers, in the lines of pumping and delivery apparatus and in processing equipment in which the product is used to manufacture down stream products.

The product dispersion is useful for making various isocyanate-based polymers such as polyurethanes and/or polyureas by reacting it with a polyisocyanate. In making such polymers, the polyisocyanate reacts with hydroxyl groups of the polyol phase and possibly silanol groups to form urethane linkages and produce a high molecular weight polymer.

The isocyanate-based polymer is in some embodiments an elastomeric material that may be non-cellular, microcellular or foamed. Polyurethanes are typically prepared by reacting the dispersion with a polyisocyanate. The dispersion of the invention may be blended with one or more additional polyols and/or other isocyanate-reactive materials to adjust the content of silicate particles to a desired level or provide particular characteristics to the isocyanate-based polymers. The reaction with the polyisocyanate is performed in the presence of a blowing agent or gas when a cellular product is desired. The reaction may be performed in a closed mold, but in some applications, such as slabstock foam, the reaction mixture is generally permitted to rise more or less freely to form a low density foam material. Generally, the dispersion of the invention can be used in the same manner as conventional polymer polyol materials, using the same general types of processes as are used with the conventional materials.

The silicate particles become dispersed in the isocyanate-based polymer. The particles can provide any of several benefits, depending in some cases on the type of isocyanate-based polymer being formed. In the case of a flexible polyurethane foam, the particles can provide attributes such as increased load-bearing and cell-opening. The particles can also affect the cell size of foams in beneficial ways. In both foamed and non-foamed polymers, the particles may provide beneficial flame resistance.

Suitable polyisocyanates include aromatic, cycloaliphatic and aliphatic isocyanate. Exemplary polyisocyanates include m-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate, naphthylene-1,5-diisocyanate, 1,3- and/or 1,4-bis(isocyanatomethyl)cyclohexane (including cis- and/or trans isomers) methoxyphenyl-2,4-diisocyanate, diphenylmethane-4,4'-diisocyanate, diphenylmethane-2,4'-diisocyanate, hydrogenated diphenylmethane-4,4'-diisocyanate, hydrogenated diphenylmethane-2,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, a polymethylene polyphenylisocyanate (PMDI), toluene-2,4,6-triisocyanate and 4,4'-dimethyldiphenylmethane-2,2',5,5'-tetraisocyanate. Preferably the polyisocyanate is diphenylmethane-4,4'-diisocyanate, diphenylmethane-2,4'-diisocyanate, PMDI, toluene-2,4-diisocyanate, toluene-2,6-diisocyanate or mixtures of any two or more thereof. Diphenylmethane-4,4'-diisocyanate, diphenylmethane-2,4'-diisocyanate and mixtures thereof are generically referred to as MDI, and all can be used. Toluene-2,4-diisocyanate, toluene-2,6-diisocyanate and mixtures thereof are generically referred to as TDI, and all can be used.

The amount of polyisocyanate used in making a polyurethane is commonly expressed in terms of isocyanate index, i.e., 100 times the ratio of NCO groups to isocyanate-reactive groups in the reaction mixture (including those provided by water if used as a blowing agent). In general, the isocyanate index may range as low as 60 and as high as 500 or more. However, for the production of conventional slabstock foam, the isocyanate index typically ranges from about 95 to 140, especially from about 105 to 115. In molded and high resiliency slabstock foam, the isocyanate index typically ranges from about 50 to about 150, especially from about 85 to about 110.

A catalyst is often used to promote the polyurethane-forming reaction. The catalyst may catalyze the "gelling" reaction between the polyol(s) and the polyisocyanate and/or, in many polyurethane foam formulation(s), the water/polyisocyanate (blowing) reaction that generates urea linkages and free carbon dioxide to expand the foam. In making water-blown foams, it is typical to use a mixture of at least one catalyst that favors the blowing reaction and at least one other that favors the gelling reaction.

A wide variety of materials are known to catalyze polyurethane-forming reactions, including tertiary amines, tertiary phosphines, various metal chelates, acid metal salts, strong bases, various metal alcoholates and phenolates and metal salts of organic acids. Catalysts of most importance are tertiary amine catalysts and organotin catalysts. Examples of tertiary amine catalysts include: trimethylamine, triethylamine, N-methylmorpholine, N-ethylmorpholine, N, N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, triethylenediamine and dimethylalkylamines where the alkyl group contains from 4 to 18 carbon atoms. Mixtures of these tertiary amine catalysts are often used.

Examples of tin catalysts are stannic chloride, stannous chloride, stannous octoate, stannous oleate, dimethyltin dilaurate, dibutyltin dilaurate, other organotin compounds of the formula $SnR_n(OR)_{4-n}$, wherein R is alkyl or aryl and n is 0-2, and the like. Commercially available tin catalysts of interest include Dabco™ T-9 and T-95 catalysts (both stannous octoate compositions available from Air Products and Chemicals).

Catalysts are typically used in small amounts, for example, each catalyst being employed from about 0.0015 to about 5% by weight of the high equivalent weight polyol.

When forming a foam, the reaction of the polyisocyanate and the polyol component is conducted in the presence of a blowing agent. Suitable blowing agents include physical blowing agents such as various low-boiling chlorofluorocarbons, fluorocarbons, hydrocarbons and the like. Fluorocarbons and hydrocarbons having low or zero global warming and ozone-depletion potentials are preferred among the physical blowing agents. Chemical blowing agents that decompose or react under the conditions of the polyurethane-forming reaction are also useful. The blowing agent may be water or a mixture of water and a physical blowing agent such as a fluorocarbon, hydrofluorocarbon, hydrochlorocarbon or hydrocarbon blowing agent. Water reacts with isocyanate groups to liberate carbon dioxide and form urea linkages. Typically, about 1 to about 7, especially from about 1.5 to about 5, parts by weight water are typically used per 100 parts by weight of polyols in the foam formulation.

Alternatively or in addition, a gas such as carbon dioxide, air, nitrogen or argon may be used as the blowing agent to produce polyurethane foam in a frothing process. Carbon dioxide can also be used as a liquid or as a supercritical fluid.

The foam can if desired by made using vacuum pressure forming methods.

A surfactant is also used when a polyurethane foam is prepared. A wide variety of silicone surfactants as are commonly used in making polyurethane foams can be used in making the foams with the polymer polyols or dispersions of this invention. Examples of such silicone surfactants are commercially available under the tradenames Tegostab™ (Th. Goldschmidt and Co.), Niax™ (GE OSi Silicones) and Dabco™ (Air Products and Chemicals).

In addition to the foregoing components, the polyurethane formulation may contain various other optional ingredients such as cell openers; fillers such as calcium carbonate; pigments and/or colorants such as titanium dioxide, iron oxide, chromium oxide, azo/diazo dyes, phthalocyanines, dioxazines and carbon black; reinforcing agents such as fiber glass, carbon fibers, flaked glass, mica, talc and the like; biocides; preservatives; antioxidants; flame retardants; and the like.

In general, a polyurethane foam is prepared by mixing the polyisocyanate and the dispersion of the invention in the presence of the blowing agent, surfactant, catalyst(s) and other optional ingredients as desired, under conditions such that the polyisocyanate and polyol phase of the dispersion react to form a polyurethane and/or polyurea polymer while the blowing agent generates a gas that expands the reacting mixture. The foam may be formed by the so-called prepolymer method (as described in U.S. Pat. No. 4,390,645, for example), in which a stoichiometric excess of the polyisocyanate is first reacted with the polyol phase of the dispersion to form a prepolymer, which is in a second step reacted with a chain extender and/or water to form the desired foam. Frothing methods (as described in U.S. Pat. Nos. 3,755,212; 3,849,156 and 3,821,130, for example), are also suitable. So-called one-shot methods (such as described in U.S. Pat. No. 2,866,744) are preferred. In such one-shot methods, the polyisocyanate and all polyisocyanate-reactive components are simultaneously brought together and caused to react. Three widely used one-shot methods that are suitable for use in this invention include slabstock flexible foam processes, high resiliency flexible slabstock foam processes, and molded flexible foam methods.

The following examples are provided to illustrate the invention, but are not intended to limit the scope thereof. All parts and percentages are by weight unless otherwise indicated.

COMPARATIVE SAMPLES A-C

Comparative Samples A-C are made using the following starting materials: 12 parts TEOS, 8 parts ammonia water, 48 parts ethanol, 3 parts water and 28 parts of a polyether polyol (Polyol A) made by propoxylating and then ethoxylating glycerin to produce a 1550 hydroxyl equivalent weight, nominally trifunctional block copolymer containing 20% by weight polymerized ethylene oxide and mainly primary hydroxyl groups.

Comparative Sample A is made by mixing the ingredients at room temperature and heating to 50° C. under agitation in a reaction vessel equipped with a condenser and mechanical stirrer. Volatiles are not stripped from the resulting dispersion because the ethanol is needed to provide enough of a liquid phase to keep the silicate particles suspended.

Comparative Sample B is made in the same manner as Comparative Sample A, without stripping volatiles from the product, by adding the polyether polyol only after the remaining ingredients have been mixed and heated together to 50° C.

Comparative Sample C is made in the same manner as Comparative Sample A, without stripping volatiles from the product, by adding the ammonia water only after the remaining ingredients have been mixed and heated together to 50° C.

In each case, a dispersion of silicate particles forms. The dispersions are permitted to stand at room temperature in a closed container for several weeks. They are observed periodically to determine whether the particles remain suspended in the liquid phase. By this measure, Comparative Samples A and B are stable for about two weeks. Comparative Sample C is stable for less than a day.

COMPARATIVE SAMPLES D AND E

Comparative Samples D and E are made using the following starting materials: 14 parts TEOS, 10 parts ammonia water, 56 parts ethanol, 3 parts water and 16 parts of Polyol A.

Comparative Sample D is made in the same manner as Comparative Sample A, without stripping volatiles from the product. One-half of Polyol A charged to the reactor, followed by a pre-mix of the TEOS, water, the remaining amount of Polyol A and three-fourths of the ethanol. This mixture is heated to 50° C. and the ammonia water and remaining ethanol are added. Comparative Sample D is stable for about 2 weeks.

Comparative Sample E is made in the same manner as Comparative Sample A, without stripping volatiles from the product, by adding the ammonia water only after the remaining ingredients had been mixed and heated together to 50° C. Comparative Sample E is stable for about 2 weeks.

None of Comparative Samples A-E is suitable for making an isocyanate-based polymer due to the large concentration of ethanol, which reacts monofunctionally with polyisocyanates.

EXAMPLES 1-3 AND COMPARATIVE SAMPLE F

Examples 1-3 are made using the following starting materials: 15 parts TEOS, 11 parts ammonia water, 4 parts water and 70 parts of Polyol A.

Example 1 is made in the same manner as Comparative Sample A, by adding the ammonia water only after the remaining ingredients had been mixed and heated together to 50° C. Volatiles are stripped from the product after the reaction is complete. Example 1 is stable for about 6 weeks.

Example 2 is made in the same manner as Comparative Sample A (with stripping volatiles from the product), by adding the TEOS only after the remaining ingredients had been mixed and heated together to 50° C. Example 2 is stable for at least 6 weeks.

The product is centrifuged to isolate silicate particles for measurement of particle size by scanning electron microscopy (SEM) analysis. The recovered particles are dried and sputtered with chromium using a high-resolution sputter-coater to produce a 5 nm coating. Imaging is performed using a scanning electron microscope operating at an accelerating voltage of 20 kV using both a second electron detector and a backscattered electron detector. Particle sizes are 200 to 500 nm, as determined by visual inspection of the produced images.

Example 3 is made in the same manner as Comparative Sample A (with stripping volatiles from the product), by adding the ammonia water only after the remaining ingredients had been mixed and heated together to 50° C. The reaction mixture is stirred mechanically for 10-15 seconds after the TEOS is added, and then allowed to react for one hour in an ultrasonic bath. Example 3 is stable for about 6 weeks. The product is centrifuged to isolate silicate particles for SEM analysis. The particle size by SEM is approximately 200-500 nm.

Comparative Sample F is made in the same manner as Example 2, except Polyol A is replaced with a 2000 equivalent weight, nominally hexa-functional random copolymer of propylene oxide and ethylene oxide (Polyol B). Polyol B contains approximately 10% by weight polymerized ethylene oxide. Fewer than 20% of its hydroxyl groups are primary hydroxyls. Polyol B is immiscible with the water in the reaction mixture. A highly non-homogeneous product with very poor stability is obtained.

EXAMPLES 4 AND 5 AND COMPARATIVE SAMPLE G

Example 4 is made in the same general manner as Example 1, from the following ingredients: 15 parts TEOS, 5 parts ammonia water, 4 parts of water and 76 parts of Polyol A. This product is stable for more than six months. Example 4 has a hydroxyl number of 34.3, contains 0.02% by weight water and has a viscosity of 469 cSt at 40° C. Total volatiles (including water) are less than 0.1% by weight.

Example 5 is made in the same general manner as Example 2, using the same formulation as Example 4. This product is stable for more than six months. Example 5 has a hydroxyl number of 43.4, contains 0.035% by weight water and has a viscosity of 407 cSt at 40° C. Total volatiles (including water) are less than 0.1% by weight.

Comparative Sample G is made in the same general manner as Example 4, except the reaction mixture is heated to 75° C. The reaction mixture gels during the reaction and cannot be taken for particle size measurement.

EXAMPLE 6

Example 4 is duplicated, except the ammonia water is added gradually to prevent an exothermic temperature rise from occurring. The product, like Example 4, is stable for at least six months. It has a hydroxyl number of 35.5, contains 0.06% by weight water, has a viscosity of 466 cSt at 40° C. and total volatiles (including water) of below 0.1 weight percent.

For comparison, Polyol A by itself has a hydroxyl number of 37.5, contains 0.04% by weight water and has a viscosity of 369 cSt at 40° C.

A viscoelastic (VE) polyurethane foam is made from the Example 6 dispersion For comparison, a similar foam (Comparative VE Foam A) is made substituting Polyol A for the Example 6 dispersion and a second comparative (Comparative VE foam B) is made by dispersing previously-formed fumed silica particles in polyols before performing the foaming reaction. The formulations are as set forth in Table 1 following.

TABLE 1

| | Parts By Weight | | |
|---|---|---|---|
| Ingredient | Inventive VE Foam | Comparative VE Foam A | Comparative VE Foam B |
| Polyol 1[1] | 45 | 45 | 45 |
| Polyol 2[2] | 22.5 | 22.5 | 22.5 |
| Polyol A | 2.5 | 32.5 | 32.5 |
| Example 6 | 30 | 0 | 0 |
| Fumed Silica Particles[3] | 0 | 0 | 1.8 |
| Catalysts[4] | 0.32 | 0.32 | 0.21 |
| Silicone Surfactant | 0.8 | 0.8 | 0.8 |
| Polymeric MDI[5] | To 84 index | To 84 index | To 84 index |
| Water | 2.05 | 2.05 | 2.05 |

[1]A nominally trifunctional copolymer of propylene oxide and ethylene oxide having a hydroxyl equivalent weight of 335. This product contains 60% by weight oxyethylene units.
[2]A nominally trifunctional poly(propylene oxide) having a hydroxyl equivalent weight of 234.
[3]Hydrophilic fumed silica particles have a surface area of 200 m$^2$/g, sold as Aerosil ® 200 by Evonik Industries. These particles are pre-blended into the mixture of Polyols 1, 2 and A.
[4]A mixture of tin and amine catalysts.
[5]Isocyanate equivalent weight 130, isocyanate functionality 2.1-2.25.

Various foam properties are evaluated for both the inventive foam and Comparative VE Foam A. Results are as indicated in Table 2. Comparative VE Foam B collapses during foaming, despite attempts during the foam production to disperse the fumed silica particles uniformly into the polyols.

TABLE 2

| Property | Inventive VE Foam | Comparative VE Foam A | Comparative VE Foam B |
|---|---|---|---|
| Density, kg/m$^3$ | 49.2 | 44.2 | Collapses |
| Compression Force Deflection, kPa | | | |
| 25% compression | 2.2 | 1.4 | |
| 50% compression | 3.3 | 2.7 | |
| 65% compression | 5.6 | 4.7 | |
| SAG factor | 2.5 | 2.5 | |
| Ratio, hardness/density | 6.7 | 6.1 | |
| Hysteresis, % | 63 | 58 | |
| Airflow (crushed foam, l/s) | 2.82 | 0.94 | |
| Tensile Strength, kPa | 80 | 55 | |
| Elongation, % | 157 | 128 | |
| Tear strength, N/m | 192 | 160 | |
| Resilience, % | 12 | 6 | |
| Cal 117 vertical burning results | Pass, 8 cm char length, 5 second after flame | Fail | |

The dispersion of the invention is seen to promote load bearing, cell opening (higher airflows), improve physical properties (increased tensile, tear and elongation) and improve flame resistance on the Cal 117 test. The formulation containing the dispersion processes easily to make good quality viscoelastic foam.

Similar results are obtained using a toluene diisocyanate-based formulation.

A high resiliency foam is made using the Example 6 dispersion. For comparison, a similar foam is made substituting another polyol (Polyol 3) for the Example 6 dispersion. The formulations are as set forth in Table 3:

TABLE 3

| | Parts By Weight | |
|---|---|---|
| Ingredient | Inventive HR Foam | Comparative HR Foam |
| Polyol 3[1] | 0 | 20 |
| PIPA Polyol[2] | 80 | 80 |
| Example 6 | 20 | 0 |
| Crosslinker[3] | 1.2 | 1.2 |
| Catalysts[4] | 0.78 | 0.80 |
| Silicone Surfactant | 0.25 | 0.25 |
| TDI[5] | To 105 index | To 105 index |
| Water | 2.53 | 2.53 |

[1]A nominally trifunctional block polymer of propylene oxide and ethylene oxide having a hydroxyl equivalent weight of about 1550, containing mostly primary hydroxyl groups.
[2]A dispersion of 20% by weight of polyisocyanate polyaddition (PIPA) particles in 80% of nominally trifunctional poly(propylene oxide) having poly(ethylene oxide) end-capping.
[3]Ortegol 204, from Evonik Industries.
[4]A mixture of tin and amine catalysts.
[5]80/20 mixture of 2,4- and 2,6-isomers, isocyanate functionality approximately 2.0.

Various foam properties are evaluated for both the inventive and comparative HR foams. Results are as indicated in Table 4.

TABLE 4

| Property | Inventive VE Foam | Comparative VE Foam |
|---|---|---|
| Density, kg/m$^3$ | 38.9 | 34.5 |
| Compression Force Deflection, kPa | | |

TABLE 4-continued

| Property | Inventive VE Foam | Comparative VE Foam |
|---|---|---|
| 25% compression | 4.7 | 3.2 |
| 50% compression | 7.4 | 5.2 |
| 65% compression | 12.7 | 9.3 |
| SAG factor | 2.7 | 2.9 |
| Ratio, hardness/density | 19 | 15 |
| Hysteresis, % | 67 | 71 |
| Airflow (crushed foam, l/s) | 1.88 | 1.95 |
| Tensile Strength, kPa | 132 | 90 |
| Elongation, % | 94 | 94 |
| Resilience, % | 48 | 55 |

The dispersion of the invention significantly increases load-bearing and tensile strength while being easily processable. These benefits are seen despite a very low level of silicate particles in the foam, and even though the foam formulation already contains a significant quantity of other dispersed polymer particles.

What is claimed is:

1. A process for making a dispersion of silicate particles in a polyol phase comprising the steps of
   a) forming a mixture by combining i) 0.5 to 50 parts by weight of at least one alkoxysilane in which the alkoxy groups each independently contain 1 to 4 carbon atoms, ii) 100 parts by weight of one or more polyols each having a hydroxyl equivalent weight of 125 to 5000, the one or more polyols having an average at least 1.8 hydroxyl groups per molecule, iii) at least one mole of water per mole of the at least one alkoxysilane and iv) a catalyst for the reaction of the alkoxysilane and water and then;
   b) at a temperature of 10 to 70° C. and under agitation, reacting the at least one alkoxysilane and water in the presence of the one or more polyols to form a dispersion of silicate particles in a continuous phase of the one or more polyols; and then
   c) stripping the dispersion to remove residual water and other volatiles.

2. The process of claim 1 wherein the alkoxysilane is tetraethoxysilane.

3. The process of claim 1 wherein the catalyst is an aqueous ammonia solution.

4. The process of claim 1 wherein the mixture formed in step a) contains, in addition to components i), ii), iii) and iv), at most 2 parts by weight, per 100 parts by weight of component ii), of volatile organic compounds.

5. The process of claim 1 wherein the mixture formed in step a) contains, in addition to components i), ii), iii) and iv), at most 2 parts by weight, per 100 parts by weight of component ii), of isocyanate-reactive compounds.

6. The process of claim 1 wherein the mixture formed in step a) contains, in addition to components i), ii), iii) and iv), at most 2 parts by weight, per 100 parts by weight of component ii), of alcohols having a hydroxyl equivalent weight of less than 150.

7. The process of claim 1 wherein the temperature in step b) is 40 to 65° C.

8. The process of claim 1 wherein in step c), the dispersion is stripped until the water content is at most 0.1 by weight of the dispersion.

9. The process of claim 8 wherein in step c), the dispersion is stripped until the volatiles content include water and other volatiles is at most 0.1 by weight of the dispersion.

* * * * *